UNITED STATES PATENT OFFICE.

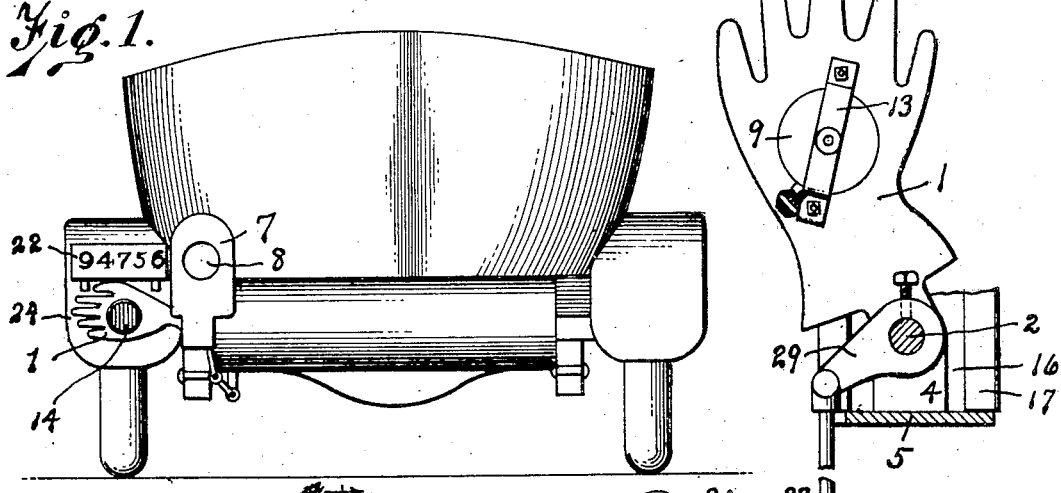
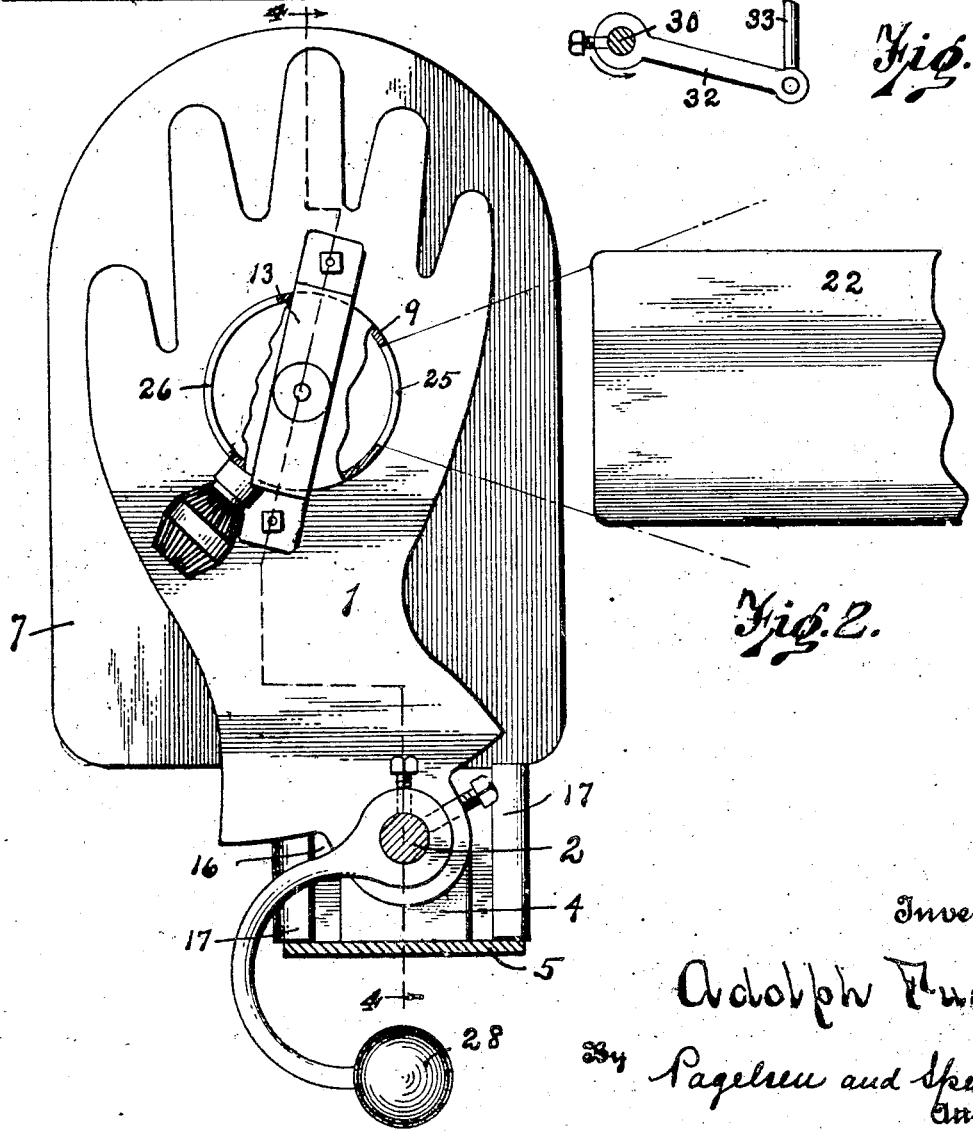

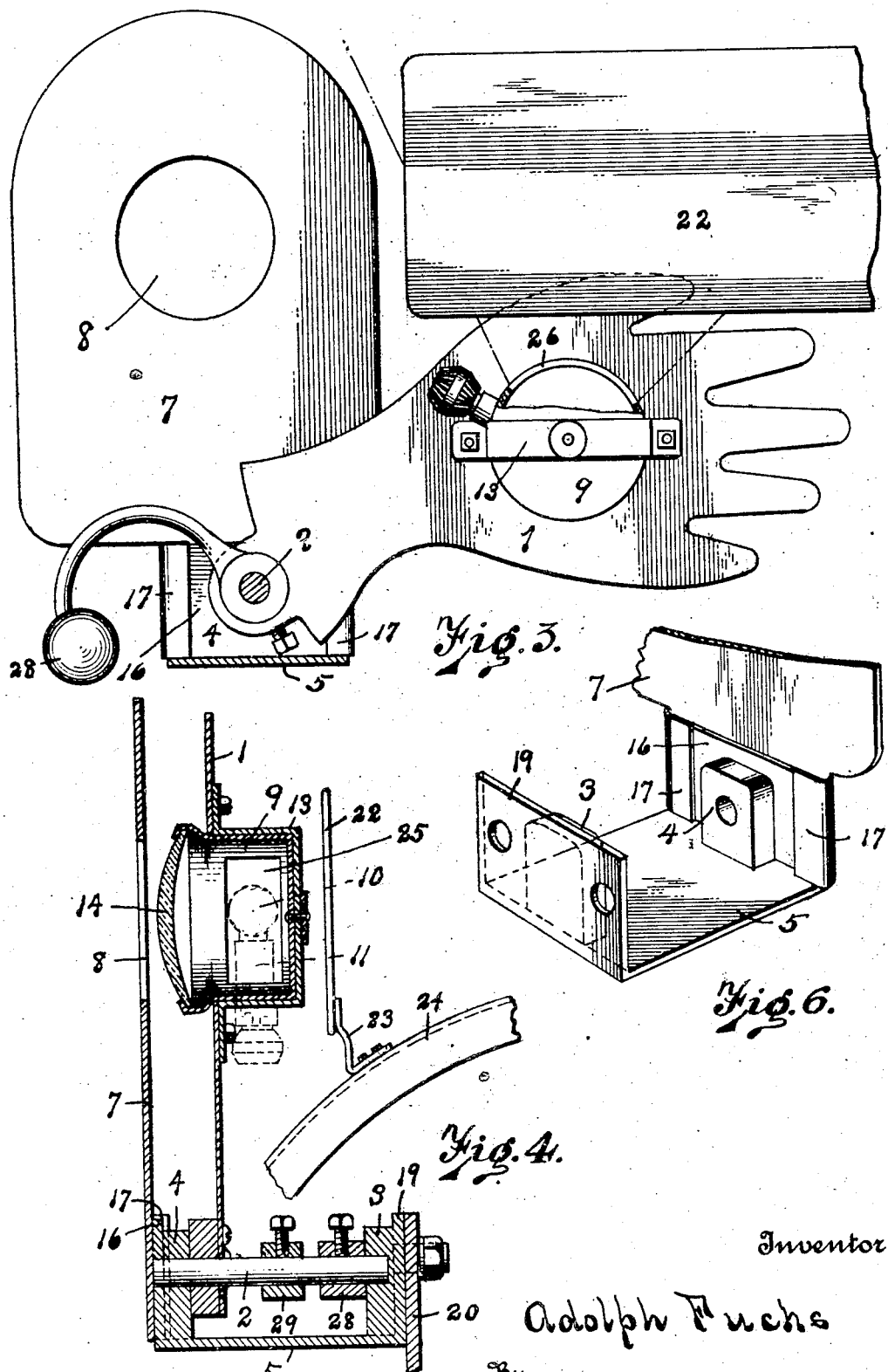

ADOLPH FUCHS, OF DETROIT, MICHIGAN.

AUTOMOBILE-SIGNAL.

1,325,193. Specification of Letters Patent. Patented Dec. 16, 1919.

Application filed June 2, 1919. Serial No. 301,232.

*To all whom it may concern:*

Be it known that I, ADOLPH FUCHS, a citizen of Russia, and residing at Detroit, in the county of Wayne and State of Michigan, have invented a new and Improved Automobile-Signal, of which the following is a specification.

This invention relates to the construction of signaling devices to be mounted on the rear ends of motor vehicles so that persons in the rear may be informed when the vehicle is to change its movement, either by turning or by stopping.

This invention consists of an indicator, preferably in the form of a hand having a regular red tail lamp mounted in its palm, a shield to normally conceal the indicator but provided with an opening through which the lamp may be seen from the rear, the hand being mounted on a pivot on which it is normally supported in upright position and which will permit the hand to swing down to horizontal position, the ordinary license plate being mounted adjacent the support for the lamp and the lamp being provided with windows through one of which light will fall on the license plate when the indicator is vertical and through the other when the indicator is horizontal. It also consists in the details of construction illustrated in the accompanying drawings and particularly pointed out in the claims.

In the drawings, Figure 1 is a rear view of an automobile with this improved signal in position. Fig. 2 is a front elevation of the signal in one position and Fig. 3 a similar view of this structure with the indicator swung down. Fig. 4 is a section on the line 4—4 of Fig. 2. Fig. 5 is a front elevation of an operating device for this signal. Fig. 6 is a perspective of the base.

Similar reference characters refer to like parts throughout the several views.

This signal comprises generally an indicator 1, preferably of sheet metal cut out in the form of a hand, mounted on a shaft 2 which may be mounted in the bearings 3 and 4 carried by the base 5. Secured to the rear end of this base is a shield 7 having an opening 8 through which light may pass from the electric lamp bulb that is mounted within the cylindrical case 9, the bulb 10 and its holder 11 being indicated by dotted lines in Fig. 4. The lamp case 9 may be secured to the indicator in any desired manner as by the strap 13, and a ruby lens 14 is mounted in the rear end of the case. In this description, "front" and "rear" are with reference to the automobile.

The shield 7 is secured at its lower end to the flange 16 of the base 5 and may have lips 17 folded around this flange as shown in Fig. 6. It is provided with an aperture 8 through which light from the lamp may pass when the indicator is elevated. The other flange 19 of the base may be connected to any desired form of support or bracket 20. Adjacent the lamp and preferably on the same height as the lamp and to the front thereof is mounted the license plate 22, brackets 23 being shown securing the plate to the fender 24. The lamp case 9 has a window opening 25 through which light may fall onto the plate 22 when the indicator is vertical as in Fig. 2 and a second window opening 26 substantially opposite the first through which light may fall onto the plate when the indicator is horizontal as in Fig. 3. The plate is a trifle forward of the lamp case so as not to interfere with the movements of the indicator.

A counterbalance 28 may be secured to the shaft 2 and any desired means may be employed to swing the indicator from the driver's seat whether it be by hand from the steering post or by the feet near or on the pedals. Such mechanism is not shown and forms no part of the present invention. A crank arm 29 is shown attached to the shaft 2 and a second shaft 30 carries a crank arm 32 connected to the arm 29 by a link 33 of any desired length and construction. The shaft 30 may be connected to the operating devices at the driver's seat by any mechanism.

The indicator will preferably be painted white so as to be easily distinguished during the day and be readily noticed when swung on its axis. The movement of the lighted lamp in an arc-shaped path at night is so noticeable that this signal is peculiarly effective. The usual red tail light is mounted on the signal and is effective for its old and new uses.

The details of construction may all be changed without departing from the spirit of my invention as set forth in the following claims.

I claim:—

1. A signal for motor vehicles comprising a pivoted indicator adapted to move from vertical to horizontal position, a license plate mounted adjacent thereto, and a lamp mounted on said indicator a distance from the pivot so it may swing through vertical arcs and is provided with light openings through one of which the license plate may be illuminated when the indicator is vertical and through the other when the indicator is horizontal.

2. In a signal for motor vehicles, the combination of a base and a shaft mounted thereon, an upright shield mounted on the base and having an opening, an indicator mounted on the shaft and a lamp mounted on the indicator a distance from the shaft and normally in alinement with said opening, a license plate mounted at substantially the height of the opening, and means to swing the indicator and lamp from upright to horizontal position, said lamp having light openings to permit light to fall on the license plate when in either position.

3. A signal for motor vehicles comprising a pivoted indicator including an electric lamp mounted on the indicator a distance from its pivot adapted to swing from vertical to horizontal positions, a license plate adapted to be illuminated by the lamp when the indicator is in either of its positions, and means to actuate the indicator.

ADOLPH FUCHS.